US011503922B2

(12) United States Patent
Jason (10) Patent No.: US 11,503,922 B2
(45) Date of Patent: Nov. 22, 2022

(54) BED BUG RESISTANT ENCASEMENT

(71) Applicant: Marc Jason, New Rochelle, NY (US)

(72) Inventor: Marc Jason, New Rochelle, NY (US)

(73) Assignee: LONDON LUXURY LLC, New Rochelle, NY (US)

( * ) Notice: Subject to any disclaimer, the term of this patent is extended or adjusted under 35 U.S.C. 154(b) by 0 days.

(21) Appl. No.: 15/917,171

(22) Filed: Mar. 9, 2018

(65) Prior Publication Data

US 2019/0274446 A1    Sep. 12, 2019

(51) Int. Cl.
*A47C 31/00* (2006.01)
*A47C 31/10* (2006.01)
*A47G 9/00* (2006.01)

(52) U.S. Cl.
CPC .......... *A47C 31/007* (2013.01); *A47C 31/105* (2013.01); *A47G 2009/001* (2013.01)

(58) Field of Classification Search
CPC ............... A47C 31/007; A47C 31/105; A47G 2009/001
See application file for complete search history.

(56) References Cited

U.S. PATENT DOCUMENTS

| 2011/0099714 A1* | 5/2011 | Svoboda | A47C 31/105 |
| | | | 5/499 |
| 2018/0192782 A1* | 7/2018 | Fischer | A47C 31/007 |

* cited by examiner

*Primary Examiner* — Peter M. Cuomo
*Assistant Examiner* — Adam C Ortiz
(74) *Attorney, Agent, or Firm* — Cozen O'Connor (57) ABSTRACT

A bed bug protective encasement for encasing an item includes: a fabric cover surrounding the item, an opening formed in the fabric cover to receive the item in the fabric cover; and a slide fastening mechanism disposed in the opening to open and close the opening. End stops of zipper tracks of the slide fastening mechanism extend beyond a bottom stop such that when a zipper head of slide fastening mechanism is at an end location in which the encasement is in a closed state, the zipper head has passed over and above the bottom stop from which the zipper head originated in a start location to define an overlapping region of the slide fastening mechanism. In the closed state, the overlapped slide fastening mechanism and attached upper and lower barrier wings together form a bed bug impervious obstruction to the escape of bed bugs from the item.

9 Claims, 6 Drawing Sheets

BED BUG RESISTANT ENCASEMENT

BACKGROUND OF THE INVENTION

1. Field of the Invention

The invention relates to an apparatus and method for preventing bed bugs from escaping from an item encased by an encasement using a zipper structure.

2. Description of the Related Art

Bed bugs are parasitic insects of the cimicid family that feed exclusively on blood. Cimex lectularis, the common bed bug, is the best known as it prefers to feed on human blood. Bed bugs commonly hide in bed mattresses and other items of furniture and feed off of the blood of humans, for example, humans sleeping on mattresses that harbor them. To feed, a bed bug crawls out of the mattress during the night, bites the sleeping victim, and then return to the mattress.

To prevent bed bugs from escaping the mattress, it is known to use a fabric cover or encasement that surrounds the mattress, or other type of furniture, to seal the exit of the bugs. This has the effect of killing the bed bugs by starving them of blood. Such an encasement is slipped onto the mattress and closed via a slide fastening mechanism such as a zipper. The fabric cover and the zipper together prevent the bed bugs from reaching the person sleeping on the mattress.

However, conventional zippered encasements do not provide a complete seal from escape at the end of the zipper and bed bugs may escape at this location. Due to the small size of bed bugs, even a narrow opening at the end of the zipper may still leave an opening large enough for a bed bug to crawl through and escape. In some cases, encasements have been developed that include extra material layers, under the zipper end, that makes it more difficult for a bed bug to migrate out of the end of the zipper. However, even in such encasements, if the bed bug makes its way to the end of the zipper, it can still escape.

Accordingly, there exists a need to prevent bed bugs from escaping through a zipper opening in a mattress protective encasement.

SUMMARY OF THE INVENTION

It is therefore an object of the present invention to provide a mattress encasement structure which prevents bed bug escapement from the zipper opening of the encasement.

It is yet another object of the present invention to provide a method of preventing bed bugs from exiting a mattress encasement at the zipper end of the encasement. In accordance with one aspect of the present invention, the zipper is provided around the mattress such that a distance of travel of the slider (or head) of the zipper from a first, open, position of the encasement, at which the zipper slider is positioned at the bottom stop of the zipper, to a second, closed, position of the encasement, at which the zipper slider is positioned at the top stops of the zipper to complete closure of the zipper, the top stops for receiving the zipper slider at the closed position being arranged beyond the bottom stop to create an overlap of the zipper, over the bottom stop in the closed position, such that the travel of the zipper slider from the open position (corresponding to an open state of the encasement) abutting the bottom stop to the closed position (corresponding to a closed state of the encasement at the top stops requires the zipper slider to travel more than the entire perimeter of the encasement. These and other objects of the invention are achieved in a mattress encasement having a zipper opening for receiving a mattress.

In accordance with a first aspect of the present invention, in a bed bug protective encasement for encasing an item, the encasement includes: a fabric cover of a size for surrounding all sides of the item, the fabric cover having a peripheral extent and being formed of a bed bug impervious fabric; an opening formed in the fabric cover, the opening extending over the entire peripheral extent of the fabric cover except for an attachment portion, the opening permitting the item to be received into the fabric cover; a slide fastening mechanism disposed in the opening and operable to close the opening after the item has been received in the fabric cover, the mechanism comprising: a zipper head; a pair of zipper tracks having a longitudinal axis, each of the zipper tracks terminating at a respective end stop at an end location of the attachment portion, the zipper head being movable between a start location of the slide fastening mechanism, in an open state of the encasement, and an end location of the slide fastening mechanism, in a closed state of the encasement; a bottom stop arranged at the start location of the slide fastening mechanism, the pair of zipper tracks each being engaged with one another in the bottom stop regardless of the position of the zipper head, wherein the end stops of the zipper tracks extend beyond the bottom stop such that when the zipper head is at the end location in which the encasement is in the closed state, the zipper head has passed over and above the bottom stop from which the zipper head originated in the start location so as to define an overlapping region of the slide fastening mechanism; and an upper barrier wing and a lower barrier wing, the lower barrier wing being disposed, in a closed state of the encasement, below the upper barrier wing and attached thereto, each barrier wing being arranged beneath the zipper tracks at the end location of the attachment portion and extending for a distance along the longitudinal axis of the zipper tracks in each direction in a region proximate the attachment portion, each barrier wing being attached to the fabric cover by stitching disposed parallel to the respective zipper tracks. In the closed state of the encasement, the overlapped slide fastening mechanism and the attached upper and lower barrier wings beneath the zipper tracks are arranged with respect to one another to form a bed bug impervious obstruction to the escape of bed bugs from the item.

In another aspect, the upper and lower barrier wings are attached to one another by a hook and loop fastener.

In another aspect, the barrier wings each comprise a fabric having one or the other of the hook and loop fastener.

In another aspect, the stitching draws the upper barrier wing into contact with the zipper tracks when the zipper head is approximately at the end location.

In another aspect, the upper and lower barrier wings exert a pressure on the zipper tracks when the zipper head is approximately at the end location, the pressure sufficient to thwart bug movement along the zipper tracks.

In another aspect, the stitching attaching the first and second barrier wings to the fabric cover run relative to each side of the longitudinal axis of the zipper tracks, the stitching being formed so as to prevent traversal by a bed bug across the stitching.

In another aspect, the stitching comprises a first row of stitching running relative to a first side of the longitudinal axis of the zipper tracks, and a second row of stitching running relative to a second side of the longitudinal axis of the zipper tracks.

In another aspect, the item is a mattress, and the fabric cover is of a size for surrounding all six sides of the mattress.

In another aspect, the overlapping region of the slide fastening mechanism has a length substantially equal to the longitudinal distance between the bottom stop and the top stops.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
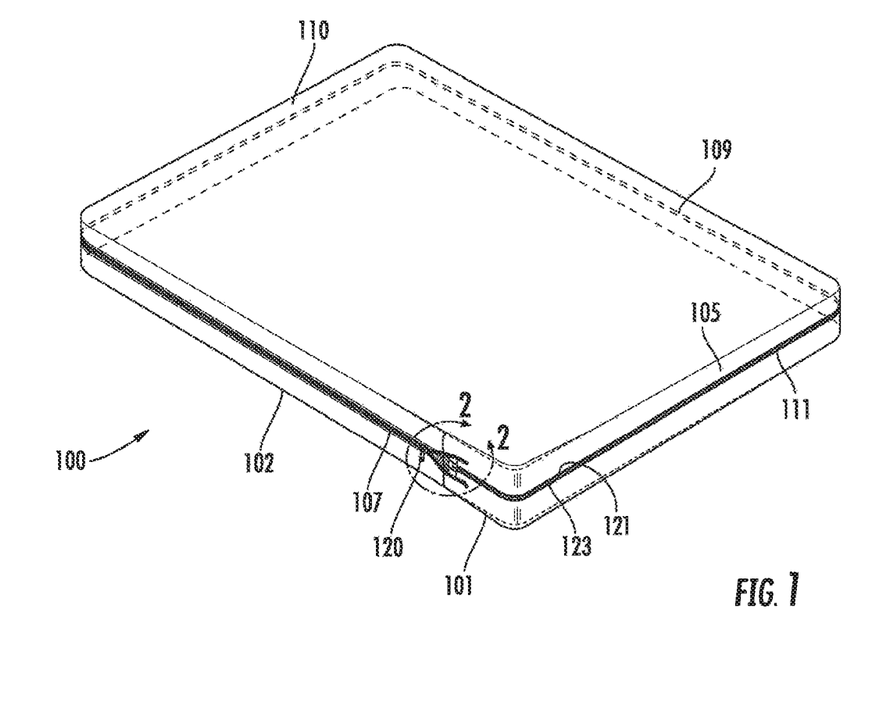
FIG. 1 is a perspective view of an embodiment of a bed bug resistant encasement in accordance with an embodiment of the present invention covering a mattress.

Referring to FIG. 1, a mattress encasement 100 surrounds a conventional mattress 101. Encasement 100 is formed from a fabric 102 sized and shaped to facilitate surrounding and engulfing the entire mattress 101. Fabric 102 of the encasement 100 is woven tightly enough so that bed bugs cannot pass through the fabric 102.

FIG. 1 shows the encasement 100 in a nearly closed position, in which a slide fastening mechanism, in particular a zipper closure 111, having a zipper head 120, is almost completely sealing the entire encasement 100. In the position shown in FIG. 1, the opening 103 extends only along a portion of the region 2 in the vicinity of the zipper head 120 at which the zipper head 120 closes the encasement 100. The region 2 is shown in more detail in FIGS. 2 and 3.

As can be seen from FIG. 1, in an embodiment of the present invention, the zipper tracks 121 and 123 of the zipper closure 111 extend around the entire perimeter of the encasement, that is, over the entire width of end 105, the entire length of side 109, the entire width of end 110 and the entire length of side 107 of the encasement, and, when the zipper closure 111 is in a fully closed position, extends an additional distance more than the entire perimeter to form an overlapping of the end of the zipper closure 111 over the starting point of the zipper enclosure. As will be described in further detail below, when the zipper closure 111 is in the fully open position, the opening 103 extends along the entire perimeter of the mattress encasement 100, except for the small portion at which the zipper head would, in this position, abut the bottom stop 126. Opening 103, when the encasement 100 is completely unzipped, allows the mattress 101 to be removed easily from the encasement 100, for example for laundering the encasement, or inserted into the encasement, as the case may be.

Opening 103 can be manipulated to go from the completely open state of the encasement 100 to the closed state of the encasement 100 by utilization of the zipper closure 111, which, in the closed position, effectively seals closed the entire encasement opening 103. Tracks 121, 123 are disposed around opening 103 in a confronting relationship and are zipped together, by operation of the zipper head 120, in the known manner.

Tracks 121, 123 have meshable teeth interleaved together by sliding of the zipper head 120 so as to guide the two tracks 121, 123 together. The teeth, when interleaved, are meshed in a very tight fitting manner. Such a tight fit makes it impossible for bed bugs to escape by travelling between the meshed teeth.

The zipper tracks 121, 123 originate at a bottom stop 126. At the bottom stop 126, the teeth of the tracks are interleaved even in the completely open position of the encasement 100. That is, in the open position of the encasement 100, shown in detail in FIG. 5, to be discussed further below, the zipper head 120 abuts the bottom stop 126 and covers the first few teeth of the zipper. Because the tracks 121 and 123 are embedded into the bottom stop 126, the first few teeth are always engaged with one another, even when the zipper head 120 is not abutting the bottom stop 126.

Figure 4:
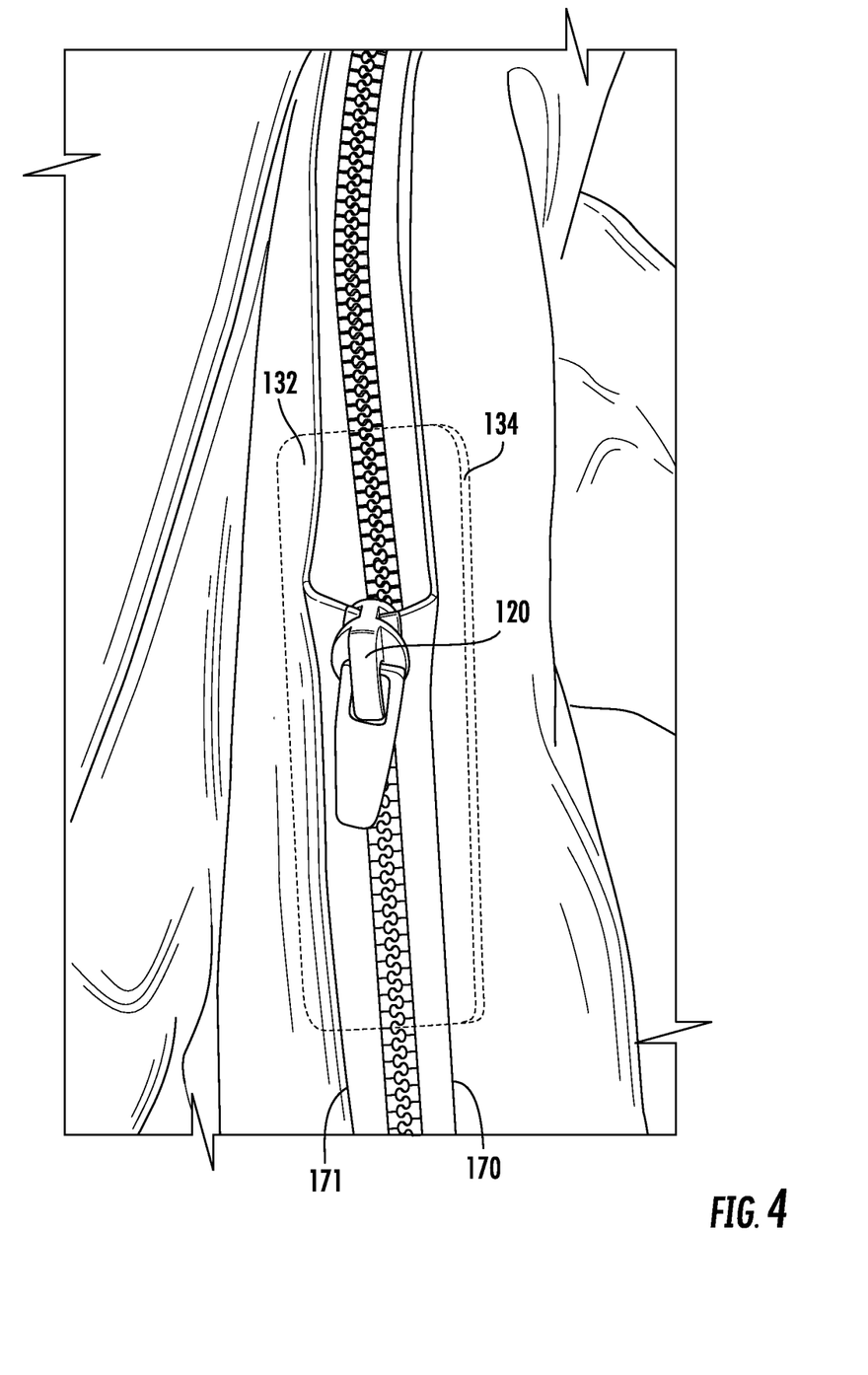
FIG. 4 is a perspective view of the zipper end location of the encasement of FIG. 1 in a second position of the zipper.

In the present invention, the zipper head 120 is movable from the first open position adjacent to and abutting the bottom stop 126 (see FIG. 5), to a closed position at which the zipper head has been moved so as to be adjacent to and enclose the two top stops 128 of the zipper, as shown in FIG. 4, to be discussed in more detail below. The top stops 128 are configured to stop the zipper head 120 from further movement along the tracks 121, 123 once the zipper head 120 has reached the fully closed position of the encasement 100.

In order to ensure that bed bugs do not escape the encasement 100, the area at which the zipper closure 111 closes the opening 103 is configured so as to form an overlapping region of the zipper closure 111. This region is shown in FIGS. 2-5, which show the structure of the overlap region with the zipper head 120 at various positions relating to the opening and closing of the encasement 100. The actual overlapping of the zipper closure 111 extends over a length (i.e., pitch) B, which is preferably substantially equal to the distance between the bottom stop 126 and the top stops 128.

As will be detailed below, according to an embodiment of the present invention, in fully closing the encasement 100, the zipper head 120 must travel beyond its starting point in the open position. That is, to fully close the encasement 100 in accordance with the present invention requires that the zipper head 120, after circumnavigating the perimeter of the encasement 100, travels past the position at which the zipper head 120 was located in the fully open position, i.e., past the bottom stop 126 (see FIG. 5).

And, after traveling completely around the perimeter, and again further beyond its originating point at the bottom stop 126, this time not engaging the bottom stop but travelling above and passing over the bottom stop on extended portions of the tracks 121 and 123, the zipper head 120 continues to travel toward the top stops 128 so as to tightly seal the tracks 121, 123 at the top stops 128. Thus, the zipper head 120 is zipped over a distance more than the length of the perimeter of the encasement to reach an end, or closing, point that is beyond the bottom stop 126 from which the zipper head originated in the open position, finally resting at the top stops 128.

As a result of this construction including the overlap, the zipper head 120 must travel a distance greater than the perimeter of the encasement 100 to seal the encasement 100. This produces the overlap region of the zipper closure having the overlap pitch B, consisting of the distance between the bottom stop 126 and the top stops 128.

Figure 2:
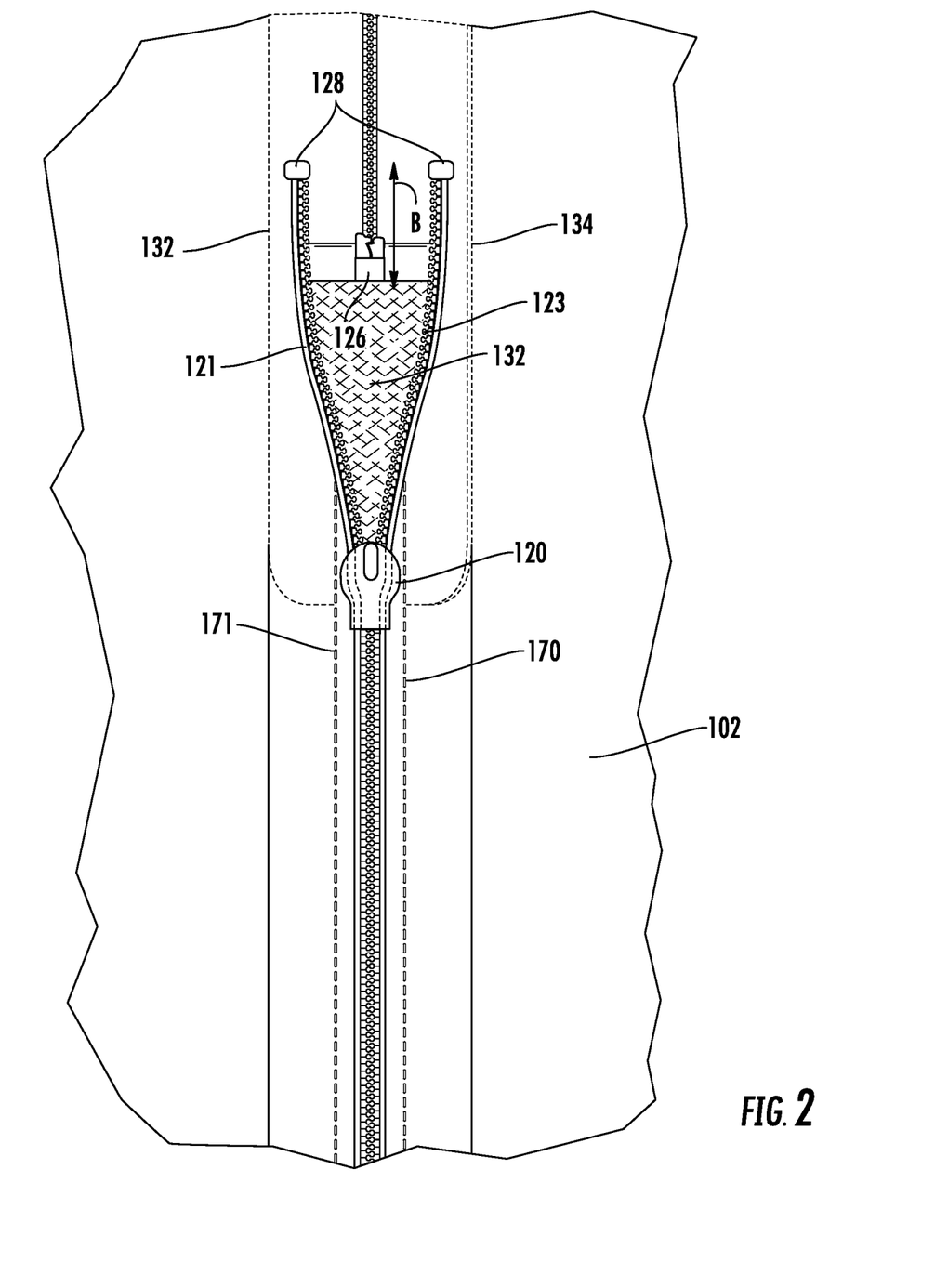
FIG. 2 is an enlarged view of a zipper end location of an encasement a region of FIG. 1.
Figure 3:
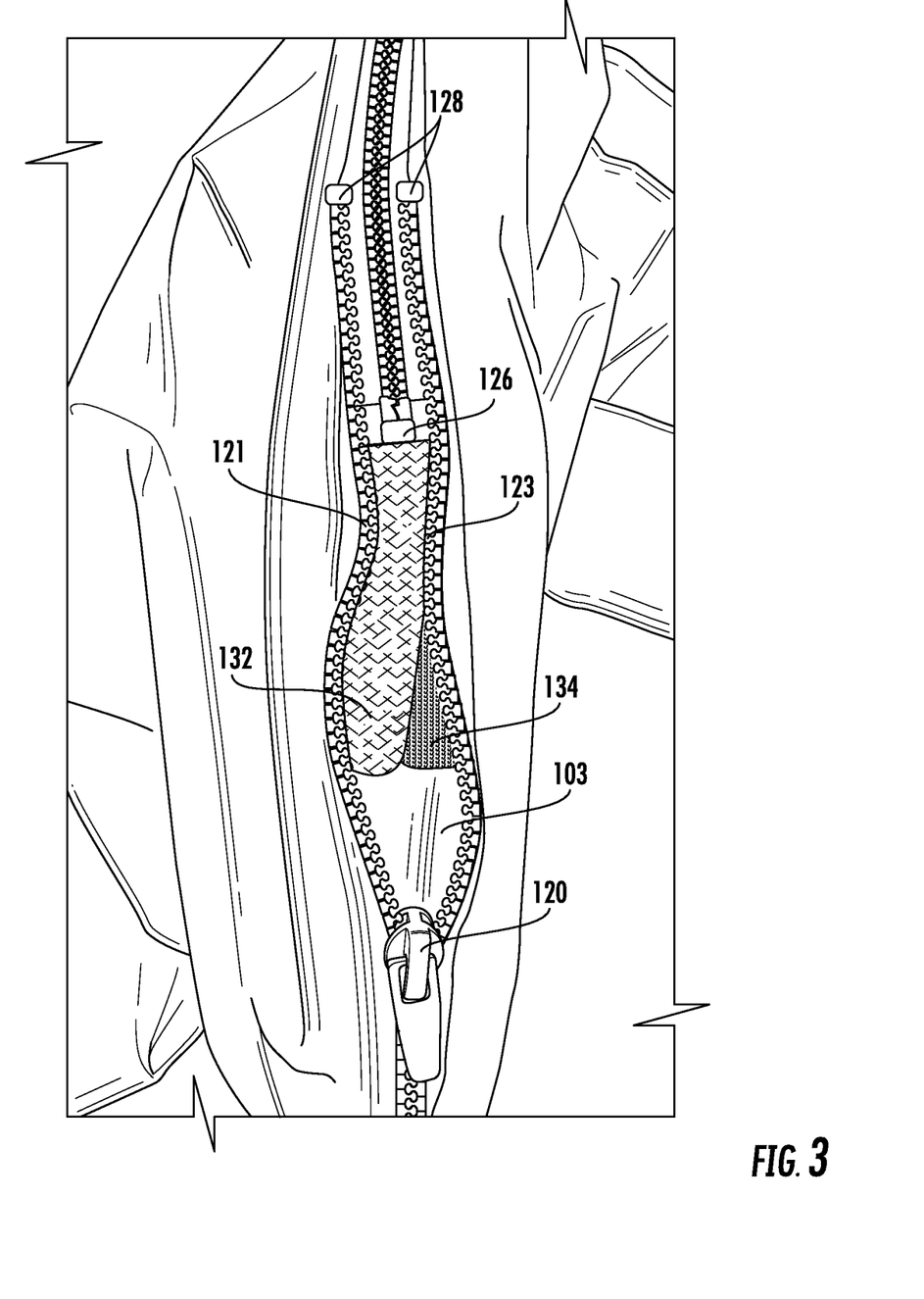
FIG. 3 is perspective view of the zipper end location of the encasement of FIG. 1 in a first position of the zipper.

FIGS. 2 and 3 show the above-described region at a point in time at which the zipper head 120 has been zipped almost entirely around the periphery of the mattress 101 (or, conversely, when the zipper head 120 has just begun to be unzipped, as these two positions are identical). In FIGS. 2 and 3, the open portion of the tracks 121, 123, each of which terminates at a respective top stop 128, are shown spread open to reveal the bottom stop 126 (from which the zipper head 120 originated in the motion of closing the encasement (and to which the zipper head 120 will end in opening motion the encasement 100 for removal of the mattress).

As can be seen in FIGS. 2 and 3, the tracks 121, 123 are arranged so that the terminal ends thereof extend beyond the bottom stop 126 providing the overlap when the zipper head passes over and above the bottom stop 126 after a complete circumnavigation of the encasement 100. In this configuration, as will be even more clear from the figures to be discussed below, the extended tracks 121, 123 permit the zipper head 120 to travel more than completely around the entire perimeter of the mattress. The zipper enclosure 111 is at least partially attached to the fabric 102 by stiches 170, 171, which assist in obstructing bed bugs from travelling laterally towards the zipper closure.

This overlapping, over the overlap pitch B, causes the closed zipper closure 111 to achieve a tight fit, providing less space for the bed bugs to escape from the encasement 100. That is, instead of the zipper head 120 ending at stops near an opening in the encasement, as in prior art encasements, in the present invention, the zipper head 120 completes is closure motion at point beyond any opening in the encasement.

To provide additional obstruction of escape by bed bugs, in a region in the vicinity of the overlap, and extending above and below the overlap pitch B, an upper wing 132 and a lower wing 134 are sewn into the fabric 102 of the encasement 100 beneath the tracks 121, 123 of the zipper closure 111. The upper and lower wings are preferably affixed to one another, preferably by hook and loop fastening, or by any appropriate removably fixable fastening technique, so that, when affixed, the upper wing 132 lies above the lower wing 134. The affixing of the upper wing 132 atop the lower wing 134 combines with the overlapping of the zipper closure 111 to make escape of the bed bugs from the end of the zipper closure 111 more difficult, both by the blocking action of the presence of the upper and lower wings, and the tightening effect of the seal formed between the wings 132 and 134. This additional tightness helps prevent any bed bugs from crawling out in the overlap region.

FIG. 2 shows, in phantom, the overlapped upper and lower wings 132, 134 under the zipper head 120 and the bottom stop 126, and under the top stops 128. The upper and lower wings 132, 134 are sewn into the inside of the encasement over a longitudinal extent of the zipper closure 111 that extends an amount beyond the top stops 128 and an amount below the bottom stop 126, as seen in the figures. In FIG. 2, the upper wing 132 can be seen between the open zipper tracks 121, 123.

Because the hook and loop connection between the wings results in a tight connection between the upper and lower wings 132, 134, this region of the zipper closure 111 is connected very tightly, leaving less room for a bed bug to make its way out of any portion of the end of the zipper closure 111 in the close position. FIG. 3 is a view illustrating a position in which the zipper head 120 is further from the end stop 126 than in FIG. 2. In this view of FIG. 3, for illustration purposes, the upper and lower wings 132, 134 are shown slightly spread apart from one another. In actual use of the encasement 100, the upper wing 132 would be positioned directly above the lower wing 134 in order to ensure a better connection therebetween, via, e.g., the hook and loop connection.

FIG. 4 shows the same region of the encasement 100 shown in FIGS. 1 and 3, in the case in which the zipper head 120 has reached its furthest point, i.e., the point at which the zipper closure 111, and therefore the encasement 100, is in the completely closed state.

In this closed state, the zipper head 120 has sealed the tracks 121, 123 all the way to the top stops 128. The bottom stop 126 is not visible in FIG. 4, as it is completely covered, i.e., overlapped, by the end portion of the zipper closure 111. In this position, the overlapping of the zipper closure 111, discussed above, and the sealing feature of the upper and lower hook and loop fastened wings 132, 134, shown here in phantom, create a tight, nearly impermeable seal against bed bug escape at the end of the zipper closure 111.

Figure 5:
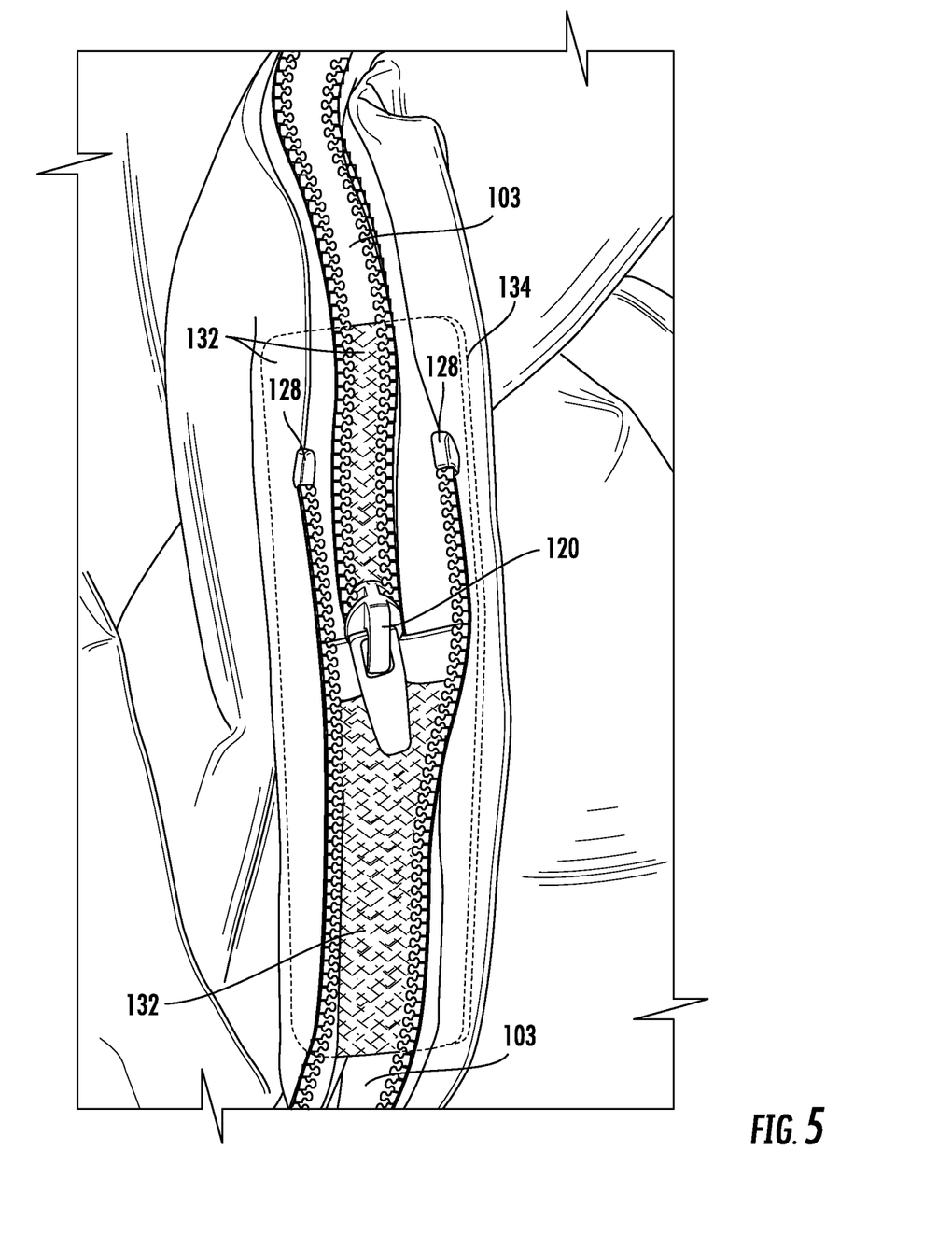
FIG. 5 is a perspective view of the zipper end location of the encasement of FIG. 1 in a third, completely open, position of the zipper.
Figure 6:
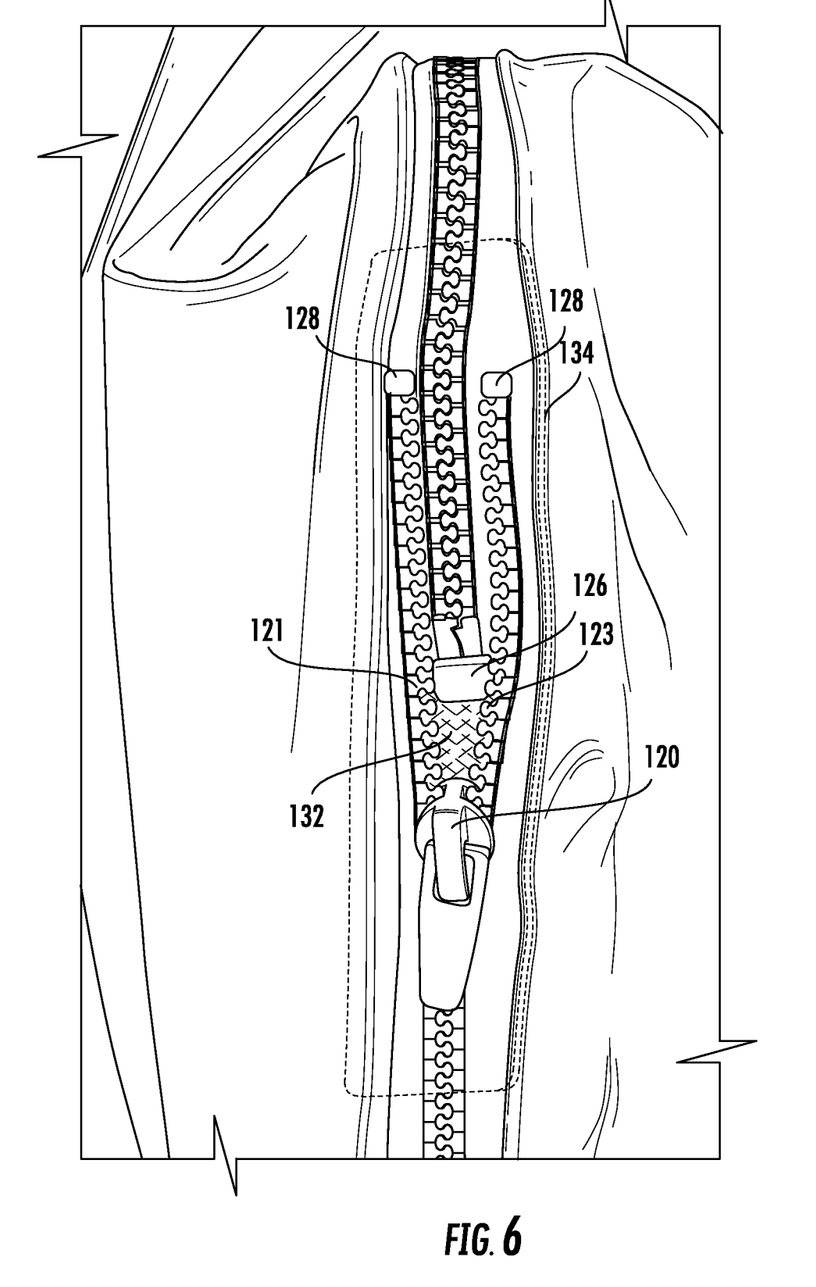
FIG. 6 is a perspective view of the zipper end location of the encasement of FIG. 1 in a fourth position of the zipper.

FIG. 5 shows the same region of the encasement in the completely open position of the zipper closure 111, that is to say, in the completely open position of the encasement 100, in which the zipper head 120 is in a position abutting the bottom stop 126. In such position, the encasement 100 is in a completely open state around almost its entire perimeter, which permits the mattress to easily be inserted into the encasement through opening 103. In FIG. 5, upper wing 132 is visible between the zipper tracks both above and below the zipper head 120.

As can be seen from the above description, the construction of the encasement 100 provides significant improvements over bed bug encasements in which the zipper closure does not extend at least around the entire periphery. Moreover, the overlapping design, in which the zipper head goes beyond, i.e., overlaps, its origination point before closing and engaging the top stops, provides a significantly smaller region from which a bed bug can escape at the end of the zipper, when compared to encasements that only zipper around a portion of the perimeter of the encasement.

Note that while the disclosed embodiments use a mattress as the furniture protected by the encasement, the encasement of the present invention can be used so enclose any furniture items, such as, for example, pillows, so as to prevent the escape of bed bugs.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A bed bug protective encasement for encasing an item, the encasement comprising:
   a fabric cover of a size for surrounding all sides of the item, the fabric cover having a peripheral extent and being formed of a bed bug impervious fabric;
   an opening formed in the fabric cover, the opening extending over the entire peripheral extent of the fabric cover except for at a bottom stop, the opening permitting the item to be received into the fabric cover;
   a slide fastening mechanism disposed in the opening and operable to close the opening after the item has been received in the fabric cover, the slide fastening mechanism comprising:
   a zipper head;
   a pair of zipper tracks, each of the zipper tracks terminating at a respective top stop at an end location of the slide fastening mechanism, the zipper head being movable between a start location of the slide fastening mechanism, in an open state of the encasement, and the end location of the slide fastening mechanism, in a closed state of the encasement;
   the bottom stop arranged at the start location of the slide fastening mechanism, the pair of zipper tracks each being fixedly engaged with one another in the bottom stop regardless of the position of the zipper head, the zipper tracks and the bottom stop being configured and arranged so that the zipper tracks are non-detachably engaged with one another at the bottom stop,
   wherein the top stops of the zipper tracks extend beyond the bottom stop such that when the zipper head is at the end location in which the encasement is in the closed state, the zipper head has passed over and above the bottom stop from which the zipper head originated in the start location so as to define an overlapping region of the slide fastening mechanism; and
   an upper barrier wing and a lower barrier wing, the lower barrier wing being disposed, in a closed state of the encasement, below the upper barrier wing and attached thereto, each barrier wing being arranged beneath the zipper tracks at the end location of the slide fastening mechanism and extending for a distance along the zipper tracks in each direction in a region proximate the end location of the slide fastening mechanism, each barrier wing being attached to the fabric cover by stitching disposed parallel to the respective zipper tracks,
   wherein, in the closed state of the encasement, the overlapped slide fastening mechanism and the attached upper and lower barrier wings beneath the zipper tracks are arranged with respect to one another to form a bed bug impervious obstruction to the escape of bed bugs from the item.

2. The bed bug protective encasement according to claim 1 wherein the upper and lower barrier wings are attached to one another by a hook and loop fastener.

3. The bed bug protective encasement according to claim 2, wherein the barrier wings each comprise a fabric having one or the other of the hook and loop fastener.

4. The bed bug protective encasement according to claim 1, wherein the stitching draws the upper barrier wing into contact with the zipper tracks when the zipper head is approximately at the end location.

5. The bed bug protective encasement according to claim 4, wherein the upper and lower barrier wings exert a pressure on the zipper tracks when the zipper head is approximately at the end location, the pressure sufficient to thwart bug movement along the zipper tracks.

6. The bed bug protective encasement according to claim 1, wherein the stitching attaching the first and second barrier wings to the fabric cover run relative to each side of the longitudinal axis of the zipper tracks, the stitching being formed so as to prevent traversal by a bed bug across the stitching.

7. The bed bug protective encasement according to claim 1, wherein the stitching comprises a first row of stitching running relative to a first side of the longitudinal axis of the zipper tracks, and a second row of stitching running relative to a second side of the longitudinal axis of the zipper tracks.

8. The bed bug protective encasement according to claim 1, wherein the item is a mattress, and the fabric cover is of a size for surrounding all six sides of the mattress.

9. The bed bug protective encasement according to claim 1, wherein the overlapping region of the slide fastening mechanism has a length substantially equal to the longitudinal distance between the bottom stop and the top stops.

* * * * *